United States Patent [19]

Fujinawa et al.

[11] Patent Number: 5,627,689
[45] Date of Patent: May 6, 1997

[54] LIGHT-SUPPLYING OPTICAL DEVICE

[75] Inventors: Nobuhiro Fujinawa; Masayuki Inami; Toshiya Aikawa, all of Kanagawa-ken, Japan

[73] Assignee: Nikon Corporation, Tokyo, Japan

[21] Appl. No.: 418,280

[22] Filed: Apr. 7, 1995

[30] Foreign Application Priority Data

Apr. 8, 1994 [JP] Japan .................................. 6-095600

[51] Int. Cl.$^6$ ...................................................... G03B 27/68
[52] U.S. Cl. ........................... 359/858; 359/711; 359/730
[58] Field of Search .............................. 359/839, 858, 359/859, 861, 726–731, 857, 710, 711, 717; 355/55, 57, 60

[56] References Cited

U.S. PATENT DOCUMENTS

| | | |
|---|---|---|
| 3,447,854 | 6/1969 | Minter . |
| 3,827,778 | 8/1974 | Wheeler . |
| 4,376,580 | 3/1983 | Novak et al. .................. 355/52 |
| 4,572,659 | 2/1986 | Omata ........................... 355/67 |
| 4,639,082 | 1/1987 | Loy . |
| 4,718,754 | 1/1988 | McIntosh . |
| 4,868,383 | 9/1989 | Kurtz et al. . |
| 4,893,920 | 1/1990 | Webb . |
| 5,090,798 | 2/1992 | Kohayakawa . |
| 5,191,406 | 3/1993 | Brandestini et al. . |
| 5,214,536 | 5/1993 | Prakash . |
| 5,255,116 | 10/1993 | Araki et al. . |
| 5,285,320 | 2/1994 | Hohberg . |
| 5,408,346 | 4/1995 | Trissel et al. . |

*Primary Examiner*—Timothy P. Callahan
*Assistant Examiner*—Eunja Shin
*Attorney, Agent, or Firm*—Oliff & Berridge

[57] ABSTRACT

An optical element that produces line bow, for example, a toric or cylindrical mirror or lens, is provided in a light-supplying optical device in addition to a first line-bow-producing optical element already present in the device so that a substantially straight line of light is formed on an original document. The light-supplying optical device also includes a light source that generates illuminating light to illuminate the original document and the first optical element that has a toric surface for collecting the illuminating light onto the original document and that is positioned so that the illuminating light shines at a certain angle relative to its toric surface. With this device, the second optical element having a toric surface is positioned in the optical path of the light source and of the original document so as to offset the curve of the illuminating light that otherwise would be generated on the original document by the first optical element.

23 Claims, 6 Drawing Sheets

LIGHT-SUPPLYING OPTICAL DEVICE

BACKGROUND OF THE INVENTION

1. Field of the Invention

The present invention relates to an image input system that reads image information by means of photoelectric transformation and, in particular, to a light-supplying optical device used in an image input system.

2. Description of Related Art

Figure 6:
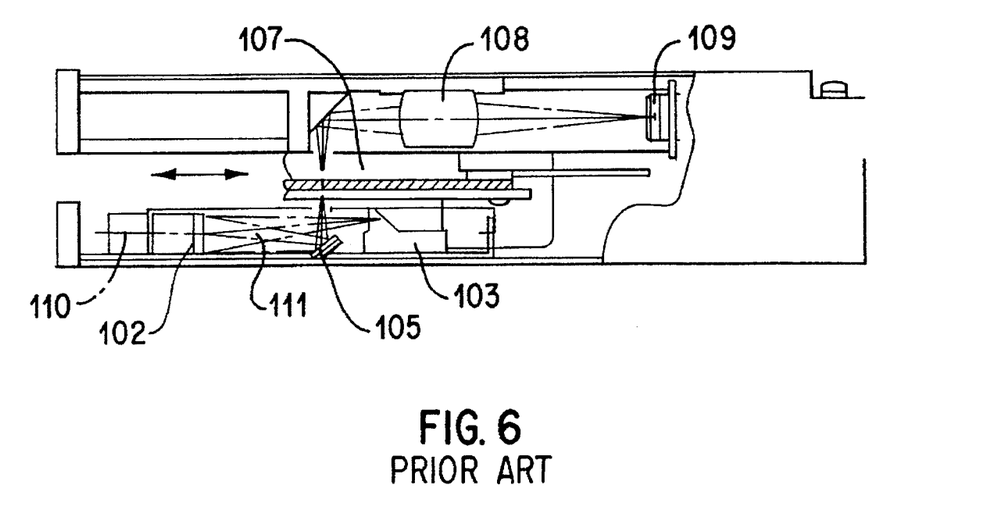
FIG. 6 shows a side view of an example of a conventional image input device.
Figure 7:
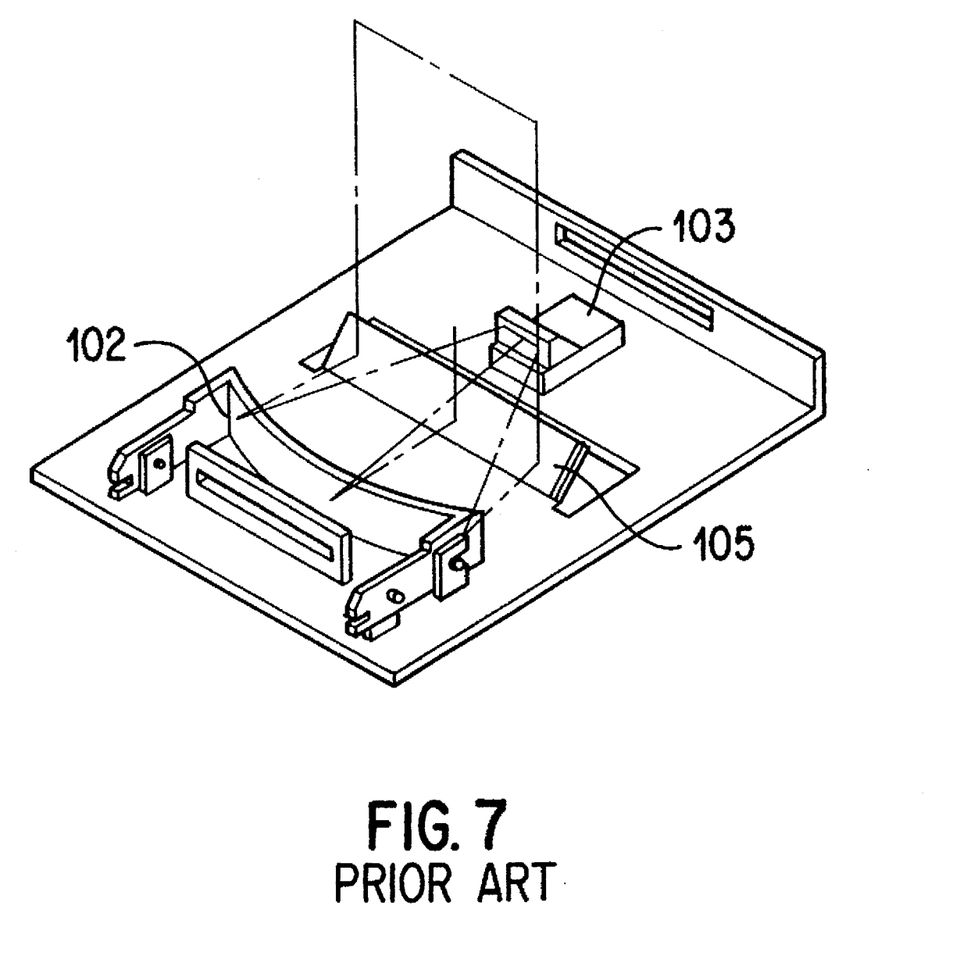
FIG. 7 shows an oblique view of an example of a conventional light-supplying optical device provided in the FIG. 6 image input device.
Figures 8A, 8B, 8C:
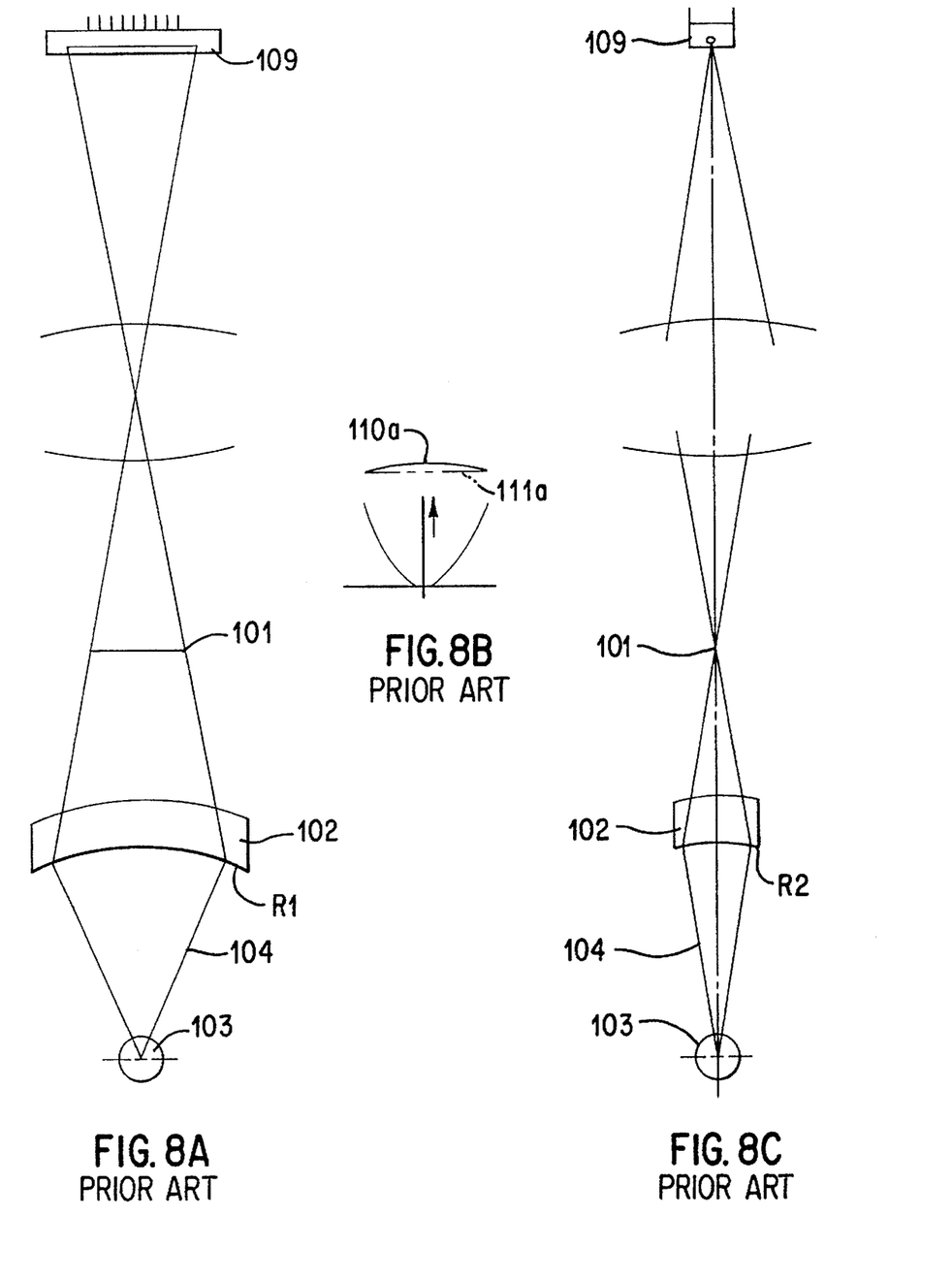
FIG. 8A illustrates the light path through the FIG. 7 light-supplying optical device when viewed from above.
FIG. 8B illustrates the line bow phenomenon and includes a graph of the amount of light detected by a linear image sensor verses position on the linear image sensor.
FIG. 8C illustrates the light path through the FIG. 7 light-supplying optical device when viewed from the side.

FIG. 6 shows a conventional image input system, the light-supplying optical device of which is shown in FIG. 7. Such a light-supplying optical device can include an optical arrangement such as is shown in FIG. 8A and FIG. 8B, in which the optical path of the light is manipulated by two mirrors 102 and 105 (see FIG. 7) so as to be contained within a confined space.

As shown in FIG. 7, one of the two mirrors used to manipulate the optical path of the light is a toric mirror 102. The toric mirror 102 is comprised of a curved surface having curvature in both the lengthwise direction (i.e., the horizontal direction as shown in FIG. 6) and in a direction perpendicular to the lengthwise direction (i.e., the vertical direction as shown in FIG. 6). The arrangement is such that light produced by the light source 103 illuminates a width of one line on the document by means of the curved surface in the lengthwise direction. That is, the curvature R1 (see FIG. 8A) in the lengthwise direction causes the rectangle of light reflected by toric mirror 102 to have a certain length. The light image provided by light source 103 is formed into a linear image onto the surface of the original document by means of the curved surface in the direction perpendicular to the lengthwise direction. That is, the curvature R2 (see FIG. 8B) in the direction perpendicular to the lengthwise direction causes the rectangle of light reflected by toric mirror 102 to have a certain width, which usually is much less than the length.

As shown in FIG. 6, light emitted from the light source 103 is incident on the toric mirror 102 at an angle 111 relative to a line 110 normal to a central portion of the mirror 102. Accordingly, the light reflected by the toric mirror 102 is reflected at the angle 111 relative to the line 110. Such light is formed into an image on the surface of the original document 101 by means of a second mirror 105, which also is referred to as an optical path conversion mirror. By moving a carriage 107 that holds the original document 101 in a secondary scan direction indicated by the arrows in FIG. 6, a linear image sensor 109 successively reads image information from the entire surface of the original document (one line at a time in what is known as the primary scan direction).

The image information (i.e., data) of the original that has been illuminated by light rays is composed into an image on the linear image sensor 109 (e.g., a charge-coupled-device (CCD)) by a projection lens 108. By moving the carriage 107 that holds the original document in the direction indicated by the arrows in FIG. 6, the information on the entire surface of the original is sequentially read by means of the CCD 109.

Figure 9A:
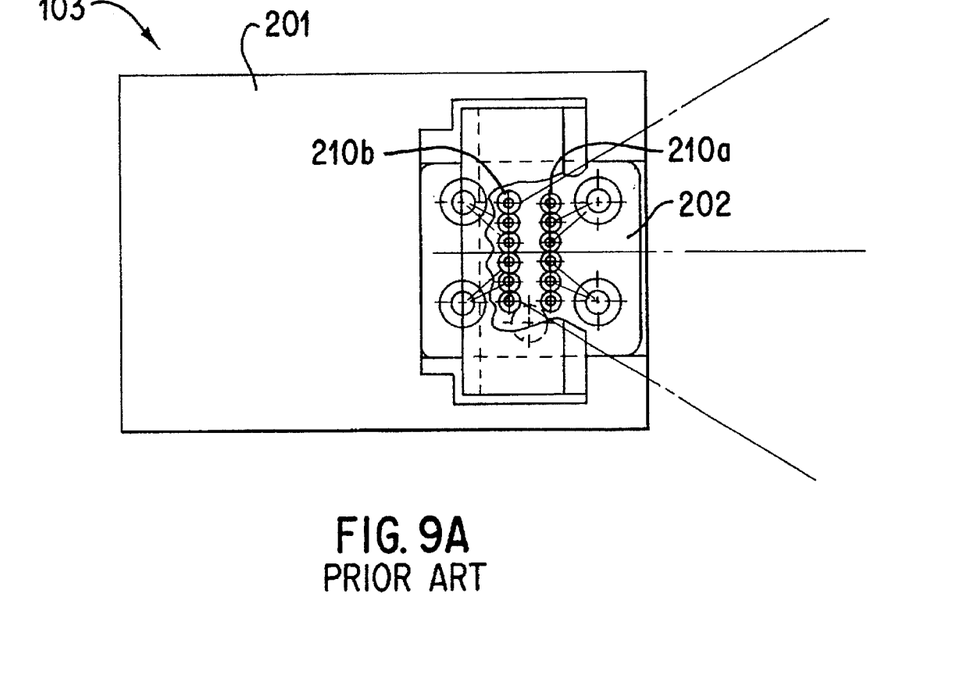
FIGS. 9A and 9B respectively show a top view and a side view of an example of a conventional light-supplying optical device.
Figure 9B:
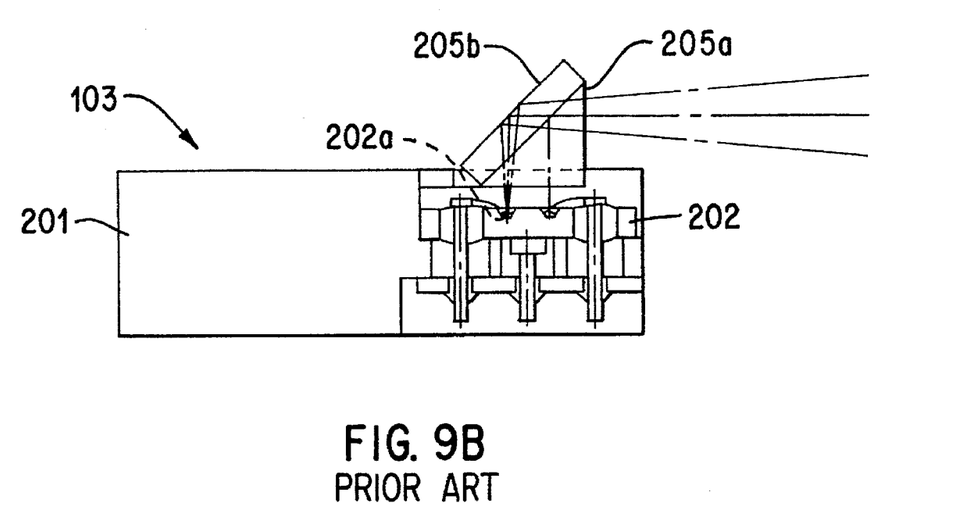

The light source 103 can be constructed as shown in FIGS. 9A and 9B. A stem 202 is affixed to the top of the light source base 201, on the top of which stem multiple LED chips 210a, 210b are arranged in a line and bonded to its top. A conical reflector 202a (see FIG. 9B) is formed at the periphery of each LED chip 210a, 210b, and reflects light emitted in the horizontal direction so that the light radiates upward from each LED chip 210a, 210b.

The light source 103 comprises two lines of LED chips 210a and 210b in order to irradiate three colors of light. The blue LEDs, which emit a smaller amount of light, are positioned in a line (e.g., 6 LEDs) 210a, while the red LEDs and green LEDs are positioned in the order GRGGRG, for example, in the other line 210b. After the light from the LED chips 210a and 210b is reflected by the reflector 202a and radiates upwardly from each chip (FIG. 9B), the light is reflected by the blue reflecting membrane 205a or by the total reflecting mirror 205b so as to be radiated forward (to the right side of FIGS. 9A and 9B, and to the left side of FIG. 6). This light is then collected by the toric mirror 102 so as to form a line or area of light on the surface of the original (see FIG. 6).

The light from the blue LEDs is reflected by the blue reflecting membrane 205a, and the light from the red and green LEDs is reflected by the total reflecting mirror 205b. When viewed from the front direction (the right side of FIGS. 9A and 9B, and the left side of FIG. 6), the three colors appear to originate from the same position. Switching of the colors RGB is electrically regulated, making high-speed reading possible.

With the conventional illuminating optical device described above, light emitted from the light source 103 is incident at the angle 111 from the line 110 normal to the toric mirror (i.e., the optical axis of the toric mirror), while the toric mirror has curvatures R1 and R2 in the perpendicular directions as shown in FIGS. 8A and 8C, which are top and side views, respectively, of the light-supplying optical device in an unfolded state. Consequently, the angle of light reflection varies between the ends and the center of the toric mirror 102. As a result, the light source image 110a formed on the surface of the original document 101 is bow-shaped, as shown in FIG. 8B, thus creating the so-called line bow phenomenon. On the other hand, because the reading line 111a of the CCD 109 on the surface of the original document is a straight line, a problem arises in that lighting cannot be obtained that is uniform at both the center and at the ends of the reading line 111a, as indicated in the graph of FIG. 8B, which is a graph showing the amount of light received by the CCD 109 relative to positions along the CCD 109.

SUMMARY OF THE INVENTION

The invention has been conceived in light of these conditions, and has an objective of forming the illuminating light on the reading surface of the original document in approximately a straight line, thereby making possible an illuminating light having a uniform amount of light.

In order to accomplish the above and other objectives, and to overcome the shortcomings in conventional devices, the light-supplying optical device of embodiments of the invention includes a second optical element that curves an area of light projected (e.g., reflected or passed) by it, in addition to a first optical element (e.g., the previously described toric mirror) that would otherwise cause a curved area of light to be projected onto an original document. The first and second optical elements are positioned in the optical path of the light generated by a light source toward the original document so that the curvatures caused by the first and second optical elements offset each other. Accordingly, a substantially straight area of light is projected onto the original document.

Thus, embodiments of the invention can address the line-bow phenomenon that typically occurs when a mirror having a curved surface is positioned relative to the light path so that the light is incident on the curved surface of the mirror at a non-zero angle relative to an optical axis of the curved surface. In conventional devices, this arrangement was such that the curved surface would reflect a straight area of light onto the original document as a curved area of light.

When the curved surfaces of the first optical element and of the second optical element of the invention each have a major axis, preferably a direction of the major axis of the curved surface of the second optical element is substantially parallel to a direction of the major axis of the curved surface of the first optical element. The second optical element also preferably is positioned in the light path so that the light is incident on the second optical element at an angle relative to an optical axis of the curved surface of the second optical element that is the same angle at which the light is incident on the curved surface of the first optical element.

The curved surface of at least one of the first and second optical elements can be a toric surface having two major axes. For example, one or both of the first and second optical elements can be a toric mirror. Additionally, one or both of the first and second optical elements can be a toric lens. Alternatively, one or both of the first and second optical elements can be a cylindrical mirror or a cylindrical lens. That is, one or both of the first and second optical elements can be light transmissive (e.g., a lens) or light reflective (e.g., a mirror). One of the first and second optical elements can be light transmissive, while the other is light reflective.

When the curved surface of the first optical element is a curved mirror, the second optical element can be located between the light source and the first optical element. In this case, the second optical element causes a curvature to be formed in the area of light received by the first optical element, this curvature being removed from the area of light by the first optical element. Alternatively, the second optical element can be located between the first optical element and the original document. In this case, the second optical element removes curvature from the area of light projected by the first optical element.

Mirrors or other optical elements typically present in light-supplying optical devices can be shaped and positioned to function as the second optical element. For example, the light source can include a mirror, which can function as the second optical element when appropriately curved and positioned. An optical path conversion mirror located downstream of the first optical element relative to the path of light so as to change a direction of the light path by about 90° also can function as the second optical element when appropriately curved and positioned. Alternatively, lenses and/or mirrors can be added to conventional light-supplying optical devices to function as the second optical element.

With a light-supplying optical device thus constructed, since the line bow effect from the first optical element and the line bow effect from the second optical element offset one another, the illuminating light on the reading surface of the original document is in the form of an approximately straight line, thereby enabling a uniform amount of light to be obtained.

BRIEF DESCRIPTION OF THE DRAWINGS

The invention will be described in conjunction with the following drawings in which like reference numerals represent like elements and wherein.

DETAILED DESCRIPTION OF PREFERRED EMBODIMENTS

Figure 1A:
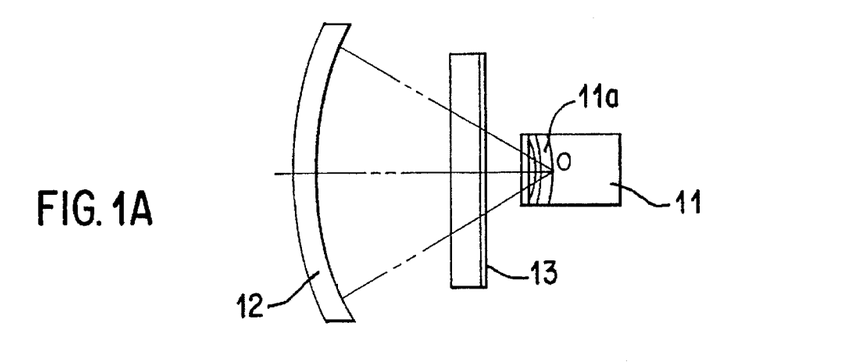
FIGS. 1A and 1B respectively show a top view and a side view of a first embodiment of a light-supplying optical device according to the present invention.
Figure 1B:
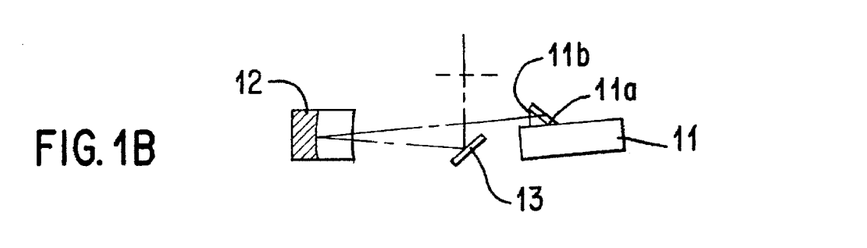

FIGS. 1A and 1B respectively show a top view and a side view of a first embodiment of a light-supplying optical device according to the present invention.

Conventionally, light for illuminating a document is conducted from a toric mirror, which causes bending (line bow) of the light to occur through the reflection of the toric mirror. In contrast, in FIGS. 1A and 1B, the shape of the total reflecting mirror 11a and the shape of the blue reflecting membrane 11b provided inside the light source 11 is a toric surface, rather than a conventional flat surface. This toric surface combines with the toric mirror 12 retained from conventional devices, thereby resulting in a total of two toric surfaces being provided in the light-supplying device. Light reflected from toric mirror 12, is reflected by optical path conversion mirror 13 toward the document, which can be a film or paper sheet, for example. By positioning the surfaces so that the directions of curvature of the line bows from the separate toric mirrors are opposite to one another, the line bow caused by the curvature of each surface is offset, enabling the attainment of an illuminating light on the document in the form of an approximately straight line. Since the illuminating light thus reaches the reading range of the linear image sensor in a virtually uniform state, illuminating irregularities will not be large.

Figure 2A:
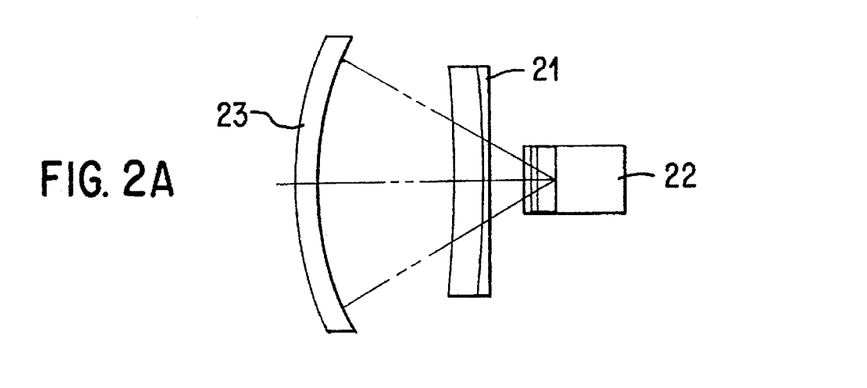
FIGS. 2A and 2B respectively show a top view and a side view of a second embodiment of a light-supplying optical device according to the present invention.
Figure 2B:
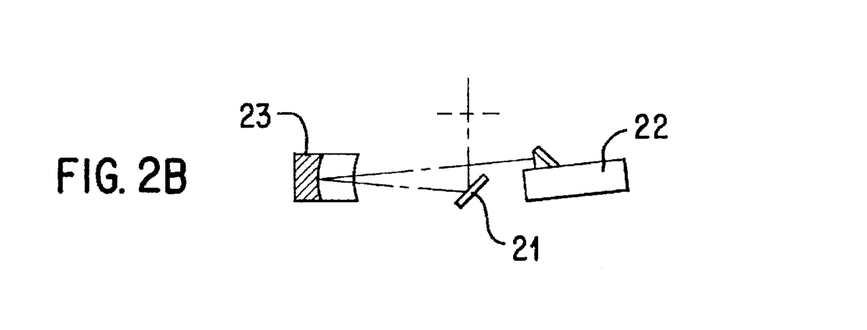

FIGS. 2A and 2B, respectively show a top view and a side view of a second embodiment of the light-supplying optical device according to the present invention.

In this second embodiment, a toric mirror 21 is provided in place of a flat mirror that is usually used as the optical path conversion mirror in order to bend the light path (i.e., to reduce the overall size of the device by changing the direction of the light). Light irradiated from the light source 22 (in the form of a straight line) is reflected from two toric mirrors 23 and 21 and conducted onto the document surface, thereby providing two toric surfaces in the light-supplying device. By positioning the toric mirrors 23 and 21 so that the directions of curvature are opposite to one another, the curvature of the lines of light reflected by the surface of each toric mirror 23 and 21 is offset (i.e., the line bow from mirrors 23 and 21 are offset), enabling the attainment of the illuminating light on the document surface in the form of an approximately straight line. Since the illuminating light thus reaches the reading range of the linear image sensor in a virtually uniform state, illuminating irregularities will not be large.

Figure 3A:
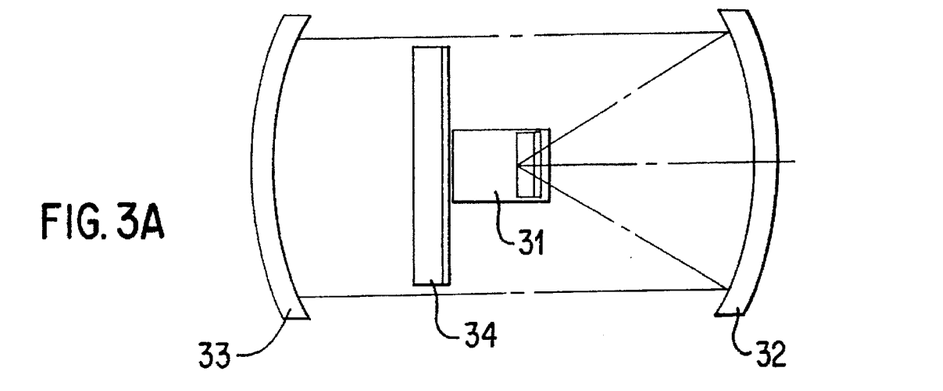
FIGS. 3A and 3B respectively show a top view and a side view of a third embodiment of a light-supplying optical device according to the present invention.
Figure 3B:
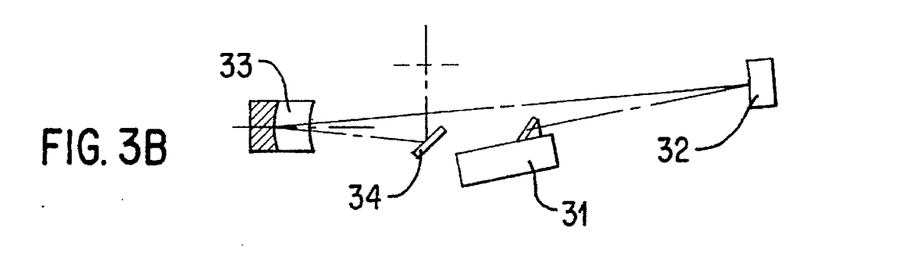

FIGS. 3A and 3B respectively show a top view and a side view of a third embodiment of the light-supplying optical device according to the present invention.

With the third embodiment, the light source faces to the right, a toric mirror 32 being newly added and positioned in front (to the right) of the light source 31. The irradiated light from the light source 31 travels toward toric mirror 33 and the optical path conversion mirror 34 after being reflected from toric mirror 32. Toric mirrors 32 and 33 have the same shape, and are positioned so that the angle of incidence of the light rays is virtually the same for each, thereby providing two toric surfaces in the light-supplying device. By positioning the toric mirrors 32 and 33 so that their directions of curvature are opposite to one another, the line bow caused by the curvature of each surface is offset, enabling the attainment of an illuminating light on the document surface in the form of an approximately straight line. Since the illuminating light thus reaches the reading range of the linear image sensor in a virtually uniform state, illuminating irregularities will not be large.

Figure 4A:
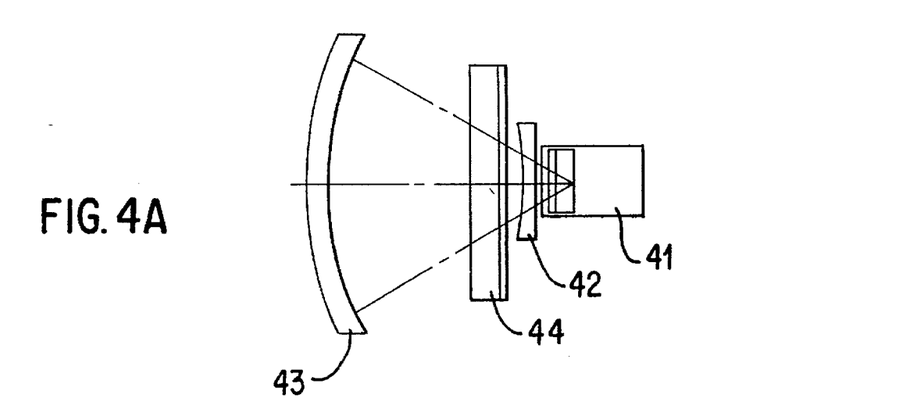
FIGS. 4A and 4B respectively show a top view and a side view of a fourth embodiment of a light-supplying optical device according to the present invention.
Figure 4B:
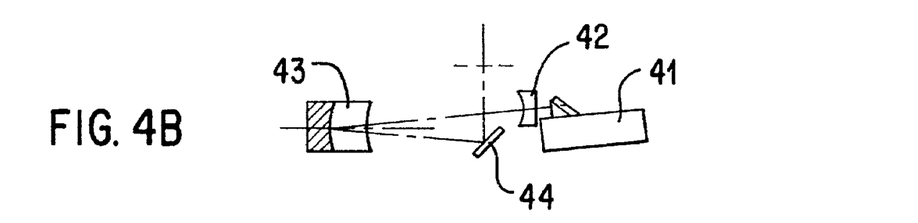

FIGS. 4A and 4B respectively show a top view and a side view of a fourth embodiment of the light-supplying optical device according to the present invention.

With the fourth embodiment, a toric lens 42 is positioned in front (downstream) of the irradiating surface of the light source 41. The light from the light source 41 travels toward the toric mirror 43 and the optical path conversion mirror 44 after passing through the toric lens 42, thereby providing two toric surfaces in the light-supplying device. By positioning the toric surfaces so that the directions of curvature are opposite, the line bow caused by the curvature of each surface is offset, thereby enabling the attainment of illuminating light on the document surface in the form of an approximately straight line. Since the illuminating light thus reaches the reading range of the linear image sensor in a virtually uniform state, illuminating irregularities will not be large.

With the first through fourth embodiments, which use the toric systems with the combinations of mirrors and lenses described above, light can be gathered into a straight line on a document surface even when the path of light from the light source to the document surface is short.

Figure 5A:
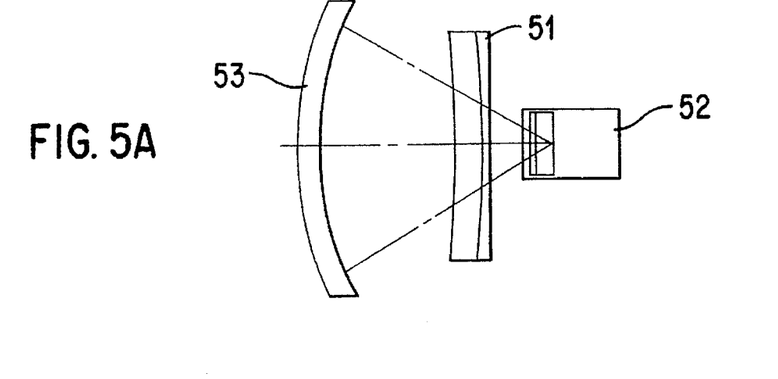
FIGS. 5A and 5B respectively show a top view and a side view of a fifth embodiment of a light-supplying optical device according to the present invention.
Figure 5B:
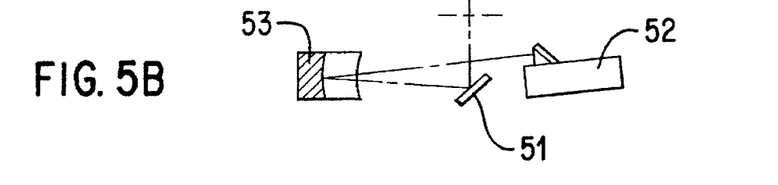

FIGS. 5A and 5B respectively show a top view and a side view of a fifth embodiment of the light-supplying optical device according to the present invention.

With the fifth embodiment, the mirror 21 shown in the second embodiment is changed to a cylindrical mirror 51, the fifth embodiment being the same as the second embodiment in all other respects. A substantially straight line or area of light is emitted by light source 52. The curvature of the surfaces of the toric mirror 53 and the cylindrical mirror 51 offset, enabling the attainment of the illuminating light on the document surface in the form of an approximately straight line. Since the illuminating light thus reaches the reading range of the linear image sensor in a virtually uniform state, illuminating irregularities will not be large.

When the present invention is used as described above, because the line bow phenomenon from the toric mirror or toric lens and the line bow phenomenon from the other toric mirror offset one another, the illuminating light on the reading surface of the original document achieves the form of an approximately straight line, and a uniform amount of illuminating light can be obtained.

With the described embodiments, a device was described in which there was at least one toric mirror having a toric surface with two principal axes. However, the same results can be obtained by using a toric surface having one principal axis or a cylindrical mirror or cylindrical lens having a cylindrical surface.

The construction of devices in accordance with the present invention is not restricted to the disclosed embodiments, it being obvious that the same results can be obtained by adding a toric or cylindrical mirror, a toric or cylindrical lens, or the like to a conventional light-supplying optical device at other locations. The invention also can be used to correct for the line-bow phenomenon when it is caused by a cylindrical or other type of mirror, or when it is caused by a toric, cylindrical, or other type of lens.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A light-supplying optical device comprising:
   a light source that generates an elongated area of light along a path to illuminate an original document;
   a first optical element having a curved surface that is in said path so as to collect the light from the light source onto the original document, said curved surface being positioned relative to said path so that the light is incident on said curved surface at a non-zero angle relative to an optical axis of said curved surface, said first optical element being positioned relative to said path so that said curved surface curves the elongated area of light that the first optical element receives on the path for projection onto the original document; and
   a second optical element having a curved surface, said second optical element being positioned in said path so as to curve the elongated area of light that the second optical element receives on the path and so as to offset an elongated curved area of light that would otherwise be projected onto the original document by said first optical element, whereby a substantially straight elongated area of light is projected onto the original document.

2. The light-supplying optical device according to claim 1, wherein said curved surfaces of said first optical element and of said second optical element each have a major axis, and a direction of the major axis of the curved surface of the second optical element is substantially parallel to a direction of the major axis of the curved surface of the first optical element.

3. The light-supplying optical device according to claim 1, wherein said second optical element is positioned in said path so that the light is incident on said second optical element at an angle relative to an optical axis of said curved surface of said second optical element that is the same angle at which the light is incident on said curved surface of said first optical element.

4. The light-supplying optical device according to claim 1, wherein said curved surface of at least one of said first and second optical elements is a toric surface having two major axes.

5. The light-supplying optical device according to claim 1, wherein at least one of said first and second optical elements is a toric mirror.

6. The light-supplying optical device according to claim 1, wherein at least one of said first and second optical elements is a toric lens.

7. The light-supplying optical device according to claim 1, wherein one of said first and second optical elements is a toric mirror and the other of said first and second optical elements is a toric lens.

8. The light-supplying optical device according to claim 1, wherein at least one of said first and second optical elements is a cylindrical mirror.

9. The light-supplying optical device according to claim 4, wherein said two major axes are substantially perpendicular to each other.

10. The light-supplying optical device of claim 1, wherein said curved surface of said first optical element is a curved mirror and said second optical element is located between said light source and said first optical element.

11. The light-supplying optical device of claim 1, wherein said curved surface of said first optical element is a curved mirror and said second optical element is located between said first optical element and the original document.

12. The light-supplying optical device of claim 1, wherein said curved surface of said first optical element is a toric surface.

13. The light-supplying optical device of claim 1, wherein said light source includes a mirror, which is said second optical element, said second optical element placing a curvature in the elongated area of light, said first optical element removing said curvature from said elongated area of light.

14. The light-supplying optical device of claim 13, wherein said mirror of said light source includes a curved partially reflective surface and a curved totally reflective surface.

15. The light-supplying optical device of claim 1, wherein said second optical element is an optical path conversion mirror located between said first optical element and the original document on said path of light, said optical path conversion mirror changing a direction of said path by about 90°, said second optical element removing a curvature placed in the elongated area of light by said first optical element.

16. The light-supplying optical device of claim 1, further comprising an optical path conversion mirror located between said first optical element and the original document on said path of light, said optical path conversion mirror changing a direction of said path by about 90°, said optical path conversion mirror being separate from said first and second optical elements.

17. The light-supplying optical device of claim 16, wherein said light source includes a mirror that is separate from said first and second optical elements.

18. A light-supplying optical device comprising:
   a light source that generates an elongated area of light along a path to illuminate an original document;
   first means for optically changing said light so as to collect said light from the light source onto the original document, said first means being positioned relative to said path so that said first means curves the elongated area of light that the first means receives on the path for projection onto the original document; and
   second means for optically changing said light, said second means being positioned in said path so as to curve the elongated area of light that the second means receives on the path and so as to offset an elongated curved area of light that would otherwise be formed on the original document by said first means, whereby a substantially straight elongated area of light is formed on the original document.

19. The light-supplying optical device of claim 18, wherein at least one of said first means and said second means is light reflective.

20. The light-supplying optical device of claim 18, wherein at least one of said first means and said second means is light transmissive.

21. The light-supplying optical device of claim 18, wherein said first means includes a curved reflective surface, and said second means is located between said first means and the original document on said path of light so that said second means removes curvature from the elongated area of light projected by said first means.

22. The light-supplying optical device of claim 18, wherein said first means includes a curved reflective surface, and said second means is located between said first means and said light source on said path of light so that said second means causes a curvature to be formed in the elongated area of light received by said first means, said curvature being removed from the elongated area of light by said first means.

23. The light-supplying optical device of claim 18, wherein said light source generates a substantially straight elongated area of light.

* * * * *